UNITED STATES PATENT OFFICE.

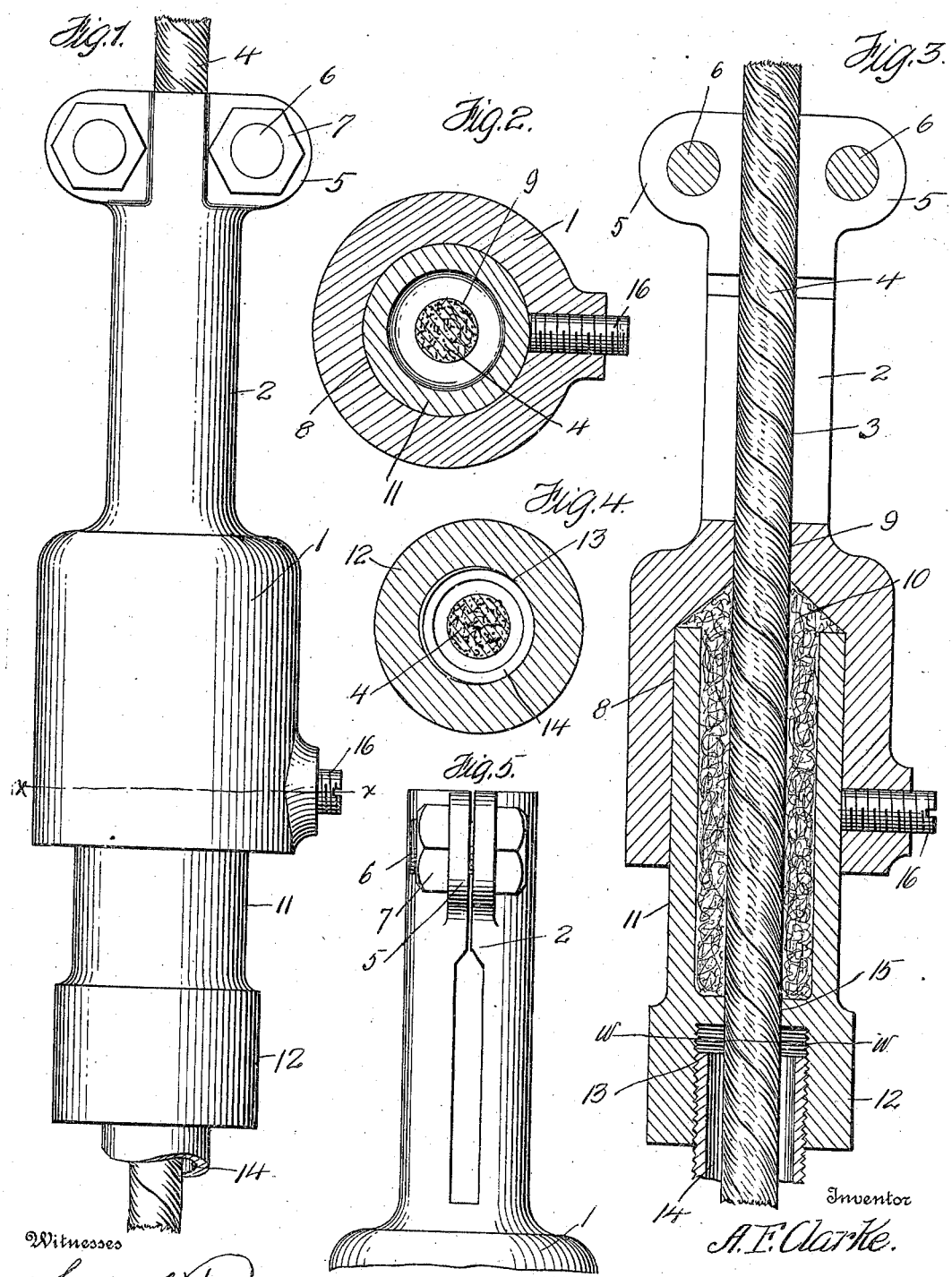

ARTHUR F. CLARKE, OF BUTLER, PENNSYLVANIA.

COMBINATION STUFFING-BOX AND CLAMP.

951,594.  Specification of Letters Patent.  Patented Mar. 8, 1910.

Application filed July 2, 1909. Serial No. 505,653.

*To all whom it may concern:*

Be it known that I, ARTHUR F. CLARKE, a citizen of the United States of America, residing at Butler, in the county of Butler and State of Pennsylvania, have invented certain new and useful Improvements in Combination Stuffing-Boxes and Clamps, of which the following is a specification, reference being had therein to the accompanying drawing.

This invention relates to a combination stuffing box and clamp, particularly designed for oil well machines, especially pumping outfits.

The invention has for its object to provide a novel clamp and stuffing box wherein simple and effective means are employed for establishing a non-leakable connection between the upper end of a pipe or tube and the cable that extends into the pipe or tube.

The structure by which I accomplish the above object is designed to facilitate operations in connection with an oil well, particularly in pumping oil from the same, and this structure will be hereinafter described in detail and then claimed.

Referring to the drawing forming part of this specification, there is illustrated a preferred embodiment of the invention, but it is understood that the structural elements thereof are susceptible to changes without departing from the spirit of the invention.

In the drawing, Figure 1 is a front elevation of the clamp and stuffing box, Fig. 2 is a horizontal sectional view of the same taken on the line X X of Fig. 1, Fig. 3 is a vertical sectional view of the clamp and stuffing box, Fig. 4 is a horizontal sectional view taken on the line W W of Fig. 3, and Fig. 5 is a side elevation of the clamp portion of my device.

In the drawings 1 denotes a cylindrical body or stuffing box provided with parallel elongated semi-cylindrical clamping members 2 having the confronting sides thereof constituting a socket 3 to receive a cable 4.

5 denotes oppositely disposed aperture lugs carried by each member 2, the lugs of one member 2 confronting the lugs of the opposing member, whereby the lugs of one ring can be clamped to the lugs of the other member by bolts 6 and nuts 7. The bolt 6 and the nut 7 are sufficient to join the members against the cable 4 whereby the clamp cannot slip or become accidentally displaced relative to the cable.

The cylindrical body 1 is provided with a vertical bore 8 through which the cable 4 extends, said bore connecting with the semi-cylindrical recesses through the medium of an opening 9. The bore 8 is adapted to receive a packing 10, and fitted into said bore is a cylindrical gland 11 adapted to receive part of the packing 10. The gland 11 is provided with a head 12 having an interiorly threaded socket 13 for the upper end of a pipe or tube 14. The socket 13 communicates with the cylindrical gland through the medium of an opening 15 through which the cable 4 extends.

16 denotes a set screw extending through the body or side of stuffing box 1 and engaging the cylindrical gland 11 for retaining said gland positioned within the box.

It is thought that the utility of the device in connection with oil well boring outfits will be fully understood without further description, and while I have not herein specified any particular packing, I reserve the right to use either a metallic or fabric material.

Having now described my invention, what I claim is:—

A combined clamping and stuffing box for cables comprising a cylindrical body constituting a stuffing box and adapted to contain a packing, said body open at one end, parallel confronting semi-cylindrical clamping members projecting from the closed end of said body and adapted to grip the cable, a cylindrical gland extending in the open end of said body, maintaining the packing within said body and surrounding the cable which extends through the body, and means carried by said body for detachably-securing the gland in position.

In testimony whereof I affix my signature in the presence of two witnesses.

ARTHUR F. CLARKE.

Witnesses:
 E. M. HUBER,
 K. D. CONNELLY.